May 29, 1934.   I. L. EASTMAN   1,960,304
MEANS FOR REMOVING LIQUID FROM AIR STORAGE TANKS
Filed Jan. 17, 1931

Inventor
Ivan L. Eastman
By Owen & Owen
Attorneys

Patented May 29, 1934

1,960,304

UNITED STATES PATENT OFFICE 1,960,304

MEANS FOR REMOVING LIQUID FROM AIR STORAGE TANKS

Ivan L. Eastman, Sylvania, Ohio, assignor to The De Vilbiss Company, Toledo, Ohio, a corporation of Ohio Application January 17, 1931, Serial No. 509,343

6 Claims. (Cl. 137—78)

This invention relates to air compressing apparatus including a tank in which the compressed air is stored for use and in which moisture condenses from the air and accumulates in the bottom in the tank.

The object of the invention is the provision, in connection with a tank, of novel, simple and efficient means that is automatically operable by variations of pressure in the tank to discharge the accumulated water of condensation from the tank.

The invention is fully described in the following specification, and while in its broader aspect it is capable of embodiment in numerous forms, one embodiment thereof is illustrated in the accompanying drawing, in which—

Figure 1:
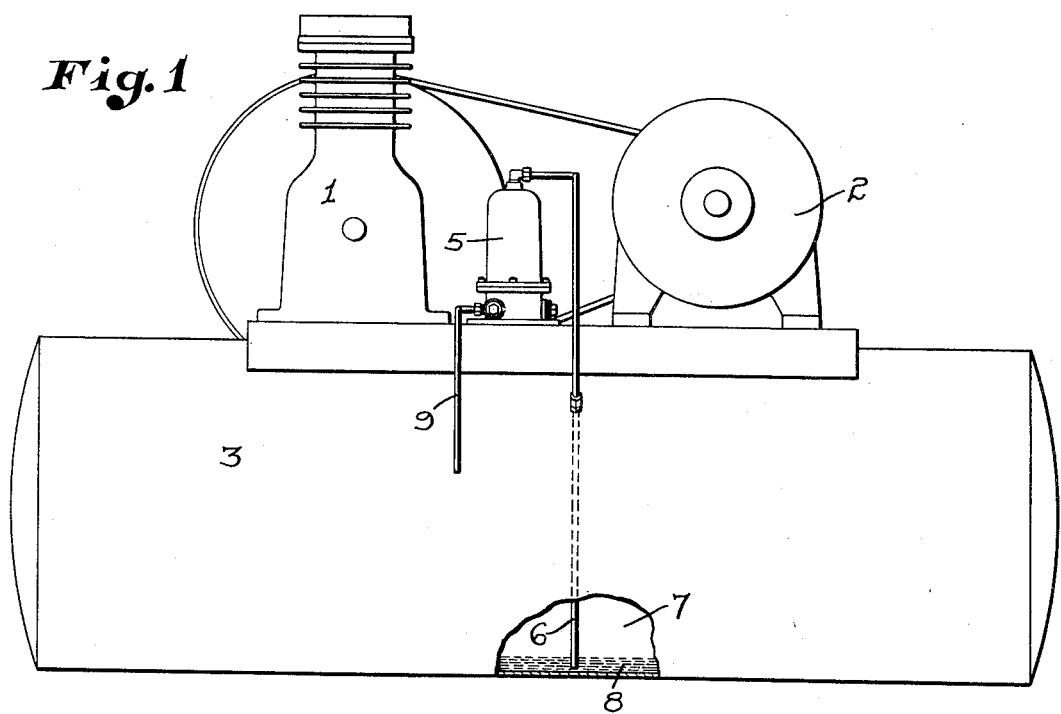
Figure 2:
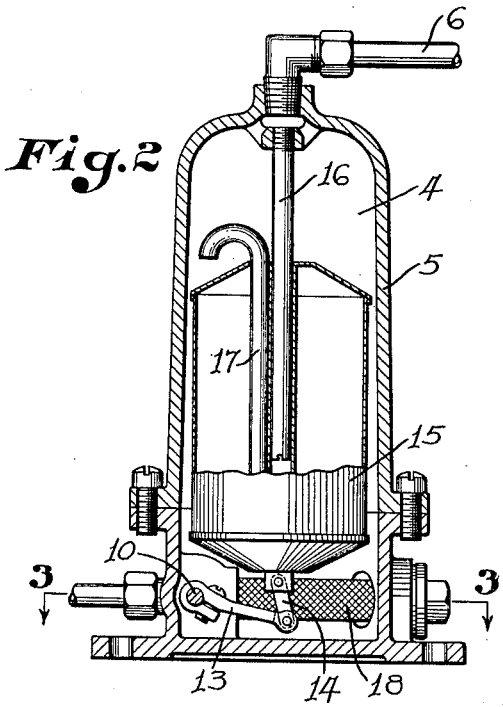
Figure 3:
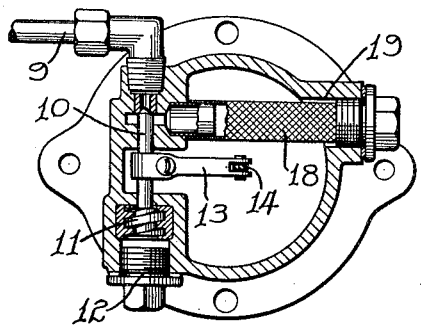

Figure 1 is a side elevation of a compressor outfit embodying the invention with the associated storage tank partly broken away. Fig. 2 is a central vertical section of a receptacle to which liquid is delivered from the storage tank, with parts in full, and Fig. 3 is a section on the line 3—3 in Fig. 2.

Referring to the drawing, 1 designates an air compressor that is driven in any suitable manner, as, for instance, by an electric motor 2, and 3 is the tank into which air is compressed and stored by the action of the compressor, as well understood in the art. The control of the motor in apparatus of this character is usually automatic, the motor being started when the pressure in the tank has dropped a predetermined extent and stopped when such pressure has been raised a predetermined extent. It is thus apparent that the pressure in the tank varies during use between the starting and stopping pressures for the motor.

The storage tank 3 is in constant open connection with the interior of a separate air receiving compartment or chamber 4 formed, in the present instance, by a small tank or receptacle 5 mounted on the top of the tank 3. The communication between the tanks 3 and 5 is through a tube 6, the total capacity of which is not greater than that of the trap or tank 5. The tube 6 extends from the upper portion of the chamber 4 to near the bottom of the air storage chamber 7 of the tank 3, so that its lower end is open to and submerged in any liquid 8 or moisture of condensation which may be present in the bottom of the chamber 7. The chamber 4 is closed except for its communication with the main storage chamber 7, and inasmuch as the communication between the two is open through the tube 6, it is apparent that the pressure in the two chambers will equalize so that any drop in pressure in the main chamber 7 will correspondingly affect the pressure in the chamber 4, and vice versa.

It is apparent that upon any equalizing of pressure between the two chambers when the pressure is being raised in the main chamber 7, any water in the chamber 7, which submerges the lower end of the tube 6, will be forced by such equalizing action through the tube 6 and into the chamber 4, thus transferring, by pneumatic action from the chamber 7 to the chamber 4, any liquid which may have accumulated in the bottom of the former.

The liquid which is transferred to the chamber 4 is intermittently drained therefrom by the automatic operation of a float actuated drainage valve in such chamber. For this purpose the receptacle is provided at its bottom with a drainage tube 9 leading to any suitable point of discharge, and the inner end of this tube is adapted to be closed, in the present instance, by a needle type of valve 10, the stem of which has a portion threaded in the casing of the receptacle 5, as at 11, in such manner that a turning movement of the valve in one direction from seated position will effect a sufficient opening thereof to permit drainage of any accumulated liquid from the bottom of the chamber 4. Access to the valve 10 for the purpose of removal is had through an opening that is normally closed by a plug 12. The valve 10 is located near one side of the chamber 4 and has an arm 13 fixedly projecting therefrom toward the central portion of the chamber. The free end of this arm is connected by a link 14 to the bottom of a float 15 that is disposed in the chamber 4 for vertical movements therein and adapted to be raised by liquid accumulated in the bottom of the chamber. The float 15 is guided by a stem 16, which projects down from the top of the receptacle 5 and loosely into a central opening in the float. A tube 17 opens communication between the interior of the float and the chamber 4 so as to permit equalizing of the air pressure therein. In the present instance communication between the interior of the chamber 4 and the drainage tube 9 is had through a screen 18 which is of cartridge form and may be removed from a plugged opening 19 for cleaning or replacement.

In the operation of my device, it is apparent that upon a lowering of the pressure in the storage chamber 7, the pressure in the supplemental chamber 4 will be correspondingly lowered due to the open connection between the two chambers, and that upon an equalizing of the pressure in the two chambers when that in the storage chamber 7 is raised, such equalizing action will cause any liquid 8, in which the lower end of the tube 6 is submerged, to be transferred in the chamber 4. When a sufficient quantity of liquid has accumulated in the chamber 4 to raise the float 15, and open the valve 10, the liquid will drain from such chamber until the float has again lowered sufficiently to close the drainage valve.

It is thus apparent that if the lower end of the tube 6 opens into any liquid contained in the bottom of the storage chamber 7, such liquid or a portion thereof, will be automatically transferred by pneumatic action to the chamber 4, which action is frequent or not, depending on the extent of use of air from the chamber 7. It is also evident that it is the accumulation of the liquid itself within the chamber 4 which controls the opening of the drainage valve, thus making the device entirely automatic in its action.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is:

1. In apparatus of the class described, a main storage tank, a trap chamber located above said tank and provided with a float controlled outlet, and a conduit connecting the bottom of said tank with the upper part of said trap chamber, said trap chamber having no outlet or inlet except said conduit, unless there is sufficient liquid in the trap chamber to raise the float to open the float controlled outlet.

2. In apparatus of the class described, a main storage tank for storing air or other gas, means for automatically maintaining the pressure in said tank between predetermined limits, a trap chamber located above said tank and provided with a float controlled outlet adapted to be opened only when there is sufficient liquid in the trap chamber to raise the float, and a conduit connecting the bottom of said tank with the upper part of said trap chamber, said trap chamber having no outlet or inlet other than above stated.

3. In apparatus of the class described, a main storage tank for storing air or other gas, means for automatically maintaining the pressure in said tank between predetermined limits, a trap chamber located above said tank and provided with a float controlled outlet adapted to be opened only when there is sufficient liquid in the trap chamber to raise the float, and a conduit connecting the bottom of said tank with the upper part of said trap chamber, said trap chamber having no outlet or inlet other than above stated, said trap chamber having sufficient capacity above the maximum liquid level therein so that a rise from a minimum to maximum pressure in the tank causes a flow of whatever liquid is contained therein to the trap and a drop from maximum to minimum pressure in the tank causes a return flow of gas from the trap to the tank.

4. In apparatus of the class described, a main storage tank for storing air or other gas, means for automatically maintaining the pressure in said tank between predetermined limits, a trap chamber located above said tank and provided with a float controlled outlet adapted to be opened only when there is sufficient liquid in the trap chamber to raise the float, and means effective upon the occurrence of the maximum pressure in the tank to transfer whatever liquid may be therein to said trap chamber, said means being effective upon the occurrence of the minimum pressure in the tank to cause a return flow of gas from the trap chamber to the tank.

5. In apparatus of the class described, a main storage tank for storing air or other gas under a pressure maintained between predetermined maximum and minimum limits, a trap chamber located above said tank and provided with a normally closed outlet adapted to be opened periodically to drain the water from the trap, and a conduit connecting the bottom of said tank with the upper part of the trap chamber, said trap chamber having no outlet or inlet other than above stated, the total space within said conduit being of less volume than the volume of pressure equalizing air which flows between the main storage tank and the conduit as the pressure in the tank varies between maximum and minimum limits.

6. In apparatus of the character described, a tank for storing air or other gas under pressure, a trap chamber sealed against communication with the surrounding atmosphere, means to cause any water of condensation, which may accumulate in said tank, to flow into the trap chamber, upon a predetermined increase of pressure in the tank, without the escape of any air from the trap chamber and to cause a return flow of air from the trap chamber to the tank upon a predetermined decrease of pressure in the latter, and float controlled means to drain water from the trap chamber.

IVAN L. EASTMAN.